(12) United States Patent
Nitta et al.

(10) Patent No.: US 11,351,969 B2
(45) Date of Patent: Jun. 7, 2022

(54) OPERATION CONTROL DEVICE FOR TRACTOR VEHICLE

(71) Applicant: ADVICS CO., LTD., Kariya (JP)

(72) Inventors: Chihiro Nitta, Aichi-ken (JP); Satoshi Fujisue, Aichi-ken (JP)

(73) Assignee: ADVICS CO., LTD., Kariya (JP)

( * ) Notice: Subject to any disclaimer, the term of this patent is extended or adjusted under 35 U.S.C. 154(b) by 256 days.

(21) Appl. No.: 16/753,996

(22) PCT Filed: Oct. 12, 2018

(86) PCT No.: PCT/JP2018/038057
§ 371 (c)(1),
(2) Date: Apr. 6, 2020

(87) PCT Pub. No.: WO2019/074088
PCT Pub. Date: Apr. 18, 2019

(65) Prior Publication Data
US 2020/0391711 A1 Dec. 17, 2020

(30) Foreign Application Priority Data

Oct. 12, 2017 (JP) .............................. JP2017-198112
Oct. 12, 2017 (JP) .............................. JP2017-198113

(51) Int. Cl.
*B60T 8/1755* (2006.01)
*B60T 7/20* (2006.01)
*B60T 8/17* (2006.01)

(52) U.S. Cl.
CPC ............ *B60T 8/17551* (2013.01); *B60T 7/20* (2013.01); *B60T 8/1708* (2013.01); *B60T 2230/06* (2013.01)

(58) Field of Classification Search
CPC ...... B60T 8/17551; B60T 7/20; B60T 8/1708; B60T 2230/06; B60T 13/662; B60T 8/1755
See application file for complete search history.

(56) References Cited

U.S. PATENT DOCUMENTS 5,615,933 A * 4/1997 Kidston .................. B60L 3/102
180/65.1
2004/0108771 A1 6/2004 Tsunehara
(Continued)

FOREIGN PATENT DOCUMENTS

JP 2004-189056 A 7/2004
JP 2011079470 A 4/2011
(Continued)

OTHER PUBLICATIONS

International Search Report (PCT/ISA/210) and translation and Written Opinion (PCT/ISA/237) dated Jan. 8, 2019, by the Japanese Patent Office as the International Searching Authority for International Application No. PCT/JP2018/038057.

*Primary Examiner* — Marthe Y Marc-Coleman
(74) *Attorney, Agent, or Firm* — Buchanan Ingersoll & Rooney PC

(57) ABSTRACT

A tractor vehicle operation control device includes a yaw rate sensor, which detects the actual yaw rate, and a controller, which executes damping control for increasing braking power on the vehicle wheels based on the actual yaw rate and damping periodic yaw motion of the tractor vehicle originating in a trailer. The controller, based on the actual yaw rate, calculates a yaw indicator representing the degree of yaw motion, and sets the front wheels braking power to be greater and sets the rear wheels braking power to be less as the yaw indicator increases. For example, the controller calculates a peak value of the actual yaw rate and determines the actual yaw rate peak value to be the yaw rate. The
(Continued)

controller also may calculate yaw angular acceleration based on the actual yaw rate and determine a yaw indicator based on the peak value of the yaw angular acceleration.

6 Claims, 4 Drawing Sheets

(56) References Cited

U.S. PATENT DOCUMENTS

2009/0105906 A1\* 4/2009 Hackney ............... B60W 30/02
                                                    701/38
2013/0030665 A1   1/2013 Nishio et al.
2013/0261919 A1   10/2013 Miyata

FOREIGN PATENT DOCUMENTS

JP    2013-209045 A    10/2013
WO    2013/015389 A1   1/2013

\* cited by examiner

OPERATION CONTROL DEVICE FOR TRACTOR VEHICLE

TECHNICAL FIELD

The present invention relates to an operation control device for a tractor vehicle.

BACKGROUND ART

Patent Literature 1 describes, for the purpose of "providing a behavior control device that executes generation of an anti-yaw moment for sway state suppression by braking power distribution control, the behavior control device preventing deceleration of a vehicle at the time of generation of the anti-yaw moment to avoid uncomfortable feeling of the driver and influence on subsequent vehicles", "generating a yaw moment that suppresses a sway state by the braking power distribution control of each wheel at the time of occurrence of the sway state, and applying a driving force determined based on the amount of deceleration of the vehicle by the braking power generated at each wheel by the braking power distribution control to the driving wheels of the vehicle".

When suppressing the sway behavior of the tractor vehicle, the sway behavior is suppressed if the braking power of the front wheels is excessively increased, but excessive understeer may occur instantaneously in the tractor. In this situation, the driver may feel uncomfortable that "the tractor unexpectedly moved sideways". Therefore, it is desirable to be able to appropriately suppress the sway behavior of the tractor vehicle while suppressing the uncomfortable feeling to the driver.

CITATIONS LIST

Patent Literature

Patent Literature 1: Japanese Unexamined Patent Application Publication No. 2011-079470

SUMMARY OF INVENTION

Technical Problems

It is an object of the present invention to provide an operation control device for a vehicle that suppresses sway behavior of a tractor vehicle, in which sway behavior is reliably suppressed and an uncomfortable feeling to a driver can be reduced.

Solutions to Problems

An operation control device for a tractor vehicle according to the present invention includes a yaw rate sensor that detects an actual yaw rate of the tractor; and a controller that executes a damping control of increasing a braking power of each of the wheels based on the actual yaw rate, and damping a periodic yaw motion of the tractor vehicle originating in the trailer.

In the operation control device for the tractor vehicle according to the present invention, the controller is configured to calculate a yaw indicator representing a degree of the yaw motion based on the actual yaw rate, and set the braking power of front wheels of the wheels to be greater and set the braking power of rear wheels of the wheels to be smaller as the yaw indicator becomes greater.

In the oscillation suppression, increasing the front wheel braking power $Ff^*$ is more effective than increasing the rear wheel braking power $Fr^*$. However, an excessive increase in the front wheel braking power $Ff^*$ may cause a transient understeer behavior, which the driver may feel uncomfortable. According to the above configuration, the distribution of the braking power of the front and rear wheels is adjusted based on the yaw indicator $Jp$. As a result, when the yaw indicator $Jp$ is large, the oscillation is reliably suppressed. Furthermore, when the yaw indicator $Jp$ is small, the understeer behavior described above is effectively suppressed, and the uncomfortable feeling to the driver can be reduced.

DESCRIPTION OF EMBODIMENT

<Symbols of Component Members, Subscripts at the End of Symbols, and Moving Direction>

An embodiment of an operation control device CS for a tractor vehicle according to the present invention will be described with reference to the drawings. In the following description, component members, calculation processes, signals, characteristics, and values having the same symbol such as "ECU" have the same functions. Furthermore, the subscript "**" at the end of various symbols indicates which of the four wheels on the front, rear, left and right of the tractor VH or the two wheels on the left and right of the trailer TR it relates to. Specifically, in the tractor VH, each subscript corresponds to [fl] for the left front wheel, [fr] for the right front wheel, [rl] for the left rear wheel, and [rr] for the right rear wheel. In the trailer TR, "tl" corresponds to the left wheel, and "tr" corresponds to the right wheel.

"f*" indicates the left and right front wheels of the tractor VH, "r*" indicates the left and right rear wheels of the tractor VH, and "t*" indicates the left and right wheels of the trailer TR. In addition, the subscript [] may be omitted. When "" is omitted, the symbol indicates a generic name of the corresponding member or the like. For example, the wheel speed sensor VWf* indicates wheel speed sensors VWfl, VWfr for the front wheel, and the wheel speed sensor VWr* indicates wheel speed sensors VWrl, VWrr for the rear wheel. The wheel speed sensor VW (also referred to as "VW", when the subscript "" is omitted) comprehensively indicates the four wheel speed sensors VWfl, VWfr, VWrl, VWrr of the tractor VH.

<Overall Configuration of an Operation Control Device for a Tractor Vehicle According to the Present Invention>

Figure 1:
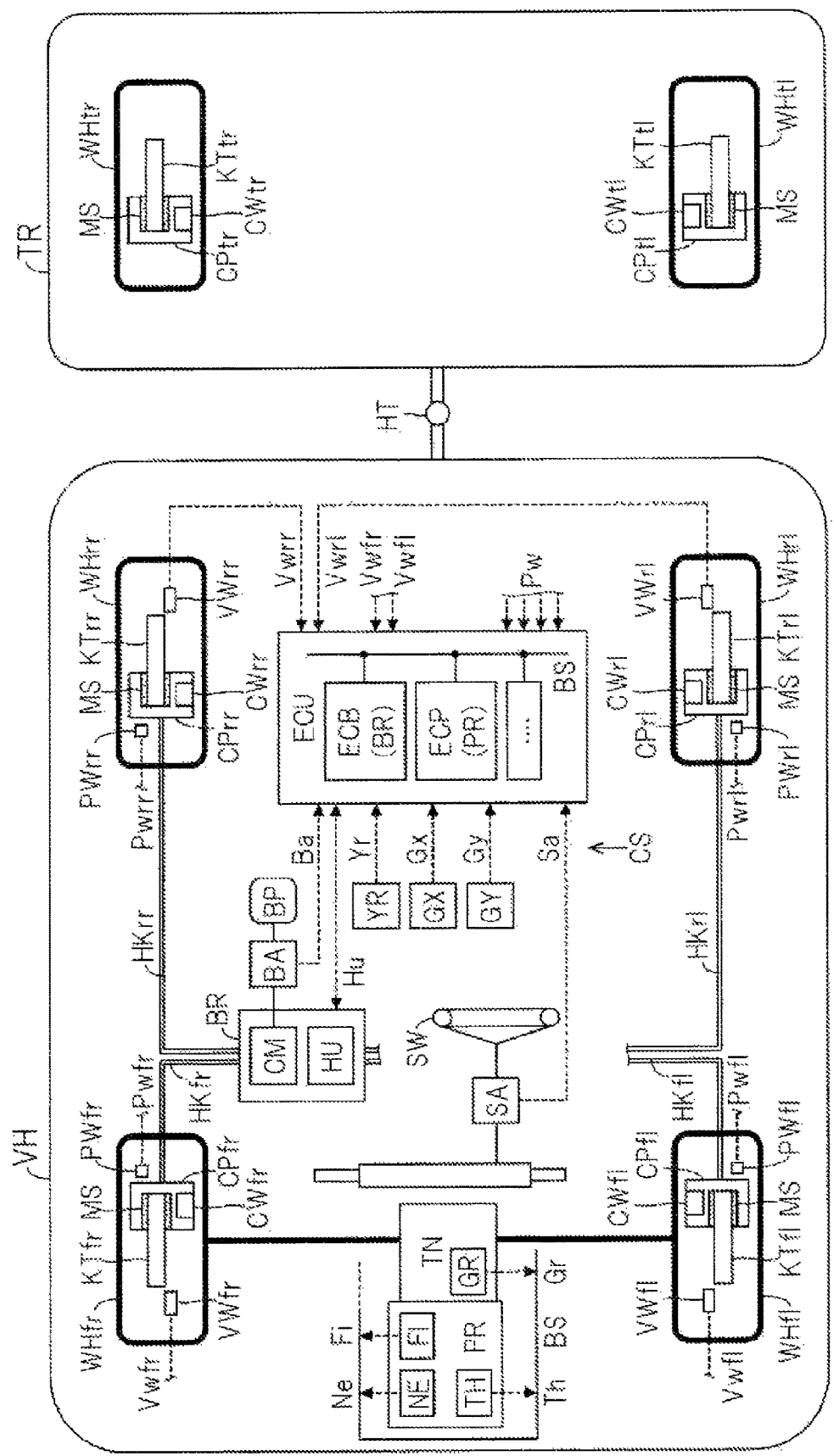
FIG. 1 is an overall configuration view of a vehicle equipped with an operation control device CS for a tractor vehicle according to the present invention.

An operation control device CS according to the present invention will be described with reference to an overall configuration view of FIG. 1. The vehicle is a so-called tractor vehicle configured by a tractor VH and a trailer TR towed by the tractor VH.

A tractor vehicle (particularly, a tractor VH) including the operation control device CS includes a brake operation member BP, a braking operation amount sensor BA, a steering operation member SW, a steering angle sensor SA, a wheel speed sensor VW, a yaw rate sensor YR, a longitudinal acceleration sensor GX, a lateral acceleration sensor GY, a brake fluid pressure sensor PW, a brake actuator (also simply referred to as "actuator") BR, and a controller ECU. Furthermore, the tractor VH includes a power source PR and a transmission TN for accelerating the tractor vehicle and traveling at a constant speed.

The brake operation member (e.g., brake pedal) BP is a member operated by the driver to decelerate the vehicle. The operation of the brake operation member BP causes a braking torque on the wheel WH [] (also simply indicated as "WH") to be adjusted and a braking power F is generated on the wheel WH**.

A braking operation amount sensor (also simply referred to as an "operation amount sensor") BA is provided to detect an operation amount Ba of the brake operation member (brake pedal) BP by the driver. Specifically, as the braking operation amount sensor BA, at least one of a master cylinder fluid pressure sensor that detects the fluid pressure (master cylinder fluid pressure) in a master cylinder CM, an operation displacement sensor that detects the operation displacement of the brake operation member BP, and an operation force sensor that detects the operation force of the brake operation member BP is adopted. That is, the braking operation amount Ba is determined based on at least one of the master cylinder fluid pressure, the braking operation displacement, and the braking operation force.

A steering operation member (e.g., steering wheel) SW is a member operated by the driver to turn the vehicle. The operation of the steering operation member SW causes the steering angle Sa to be applied to the steering wheel (e.g., front wheels WHf*), and a left-right force is generated on the wheels WH** thus turning the vehicle.

The steering angle sensor SA is provided to detect a rotation angle (steering angle) Sa of the steering operation member SW. For example, the steering angle Sa is a rotation angle from the steering neutral position "Sa=0" corresponding to the straight traveling of the vehicle. At the steering angle Sa, the left turning direction is represented by a positive sign, and the right turning direction is represented by a negative sign.

Furthermore, although not shown, an acceleration operation member (e.g., accelerator pedal) operated by the driver to adjust the output of the power source PR of the vehicle and accelerate the vehicle is provided. The transmission TN includes a speed change operation member (e.g., shift lever) for performing a speed change operation. An acceleration operation amount sensor for detecting an operation amount of the acceleration operation member and a shift position sensor for detecting a shift position of the speed change operation member are provided.

The power source PR (e.g., internal combustion engine) includes a throttle sensor TH that detects a throttle opening Th, an injection amount sensor FI that detects a fuel injection amount Fi, and a rotation number sensor NE that detects a driving rotation number Ne. The transmission TN is provided with a gear position sensor GR for detecting a gear ratio (gear position) Gr. The throttle opening Th, the fuel injection amount Fi, the driving rotation number Ne of the power source, and the gear position Gr are used to calculate the output (driving torque) of the vehicle power train (generic name for the power source PR and the transmission TN). When the power source PR is an electric motor for driving, the energization amount (e.g., current value) to the power source PR can be detected. A signal obtained by each sensor is input to the controller ECU via the communication bus BS.

The tractor VH includes a wheel speed sensor VW that detects a wheel speed Vw, which is a rotation speed of the wheel WH**. The tractor VH includes a vehicle behavior sensor that detects the operation state of the vehicle. Specifically, the yaw rate sensor YR that detects the actual yaw rate (yaw angular velocity) Yr of the vehicle, the longitudinal acceleration sensor GX that detects an acceleration (longitudinal acceleration) Gx in the front-rear direction of the vehicle, and the lateral acceleration sensor GY that detects an acceleration (lateral acceleration) Gy in the left-right direction of the vehicle are provided.

A brake caliper CP, a wheel cylinder CW, a rotating member KT, and a friction member MS are provided on each wheel WH of the vehicle. Specifically, a rotating member (e.g., a brake disk, also simply referred to as "KT") KT is fixed to the wheel WH, and a brake caliper CP (simply indicated as "CP") is arranged to sandwich the same. The wheel cylinder CW (also simply indicated as "CW") is provided in the brake caliper (also simply referred to as caliper) CP. As the fluid pressure in the wheel cylinder CW is adjusted (increased or decreased), the piston in the wheel cylinder CW is moved (forward or backward) with respect to the rotating member KT. This movement of the piston causes a friction member (e.g., brake pad) MS to be pressed against the rotating member KT, thus generating a pressing force. The rotating member KT and the wheel WH are fixed so as to rotate integrally. Therefore, a braking torque (as a result, braking power F) is generated at the wheel WH by the friction force generated by the pressing force. The tractor VH includes a brake fluid pressure sensor PW to detect the brake fluid pressure Pw of the wheel cylinder CW**.

The brake actuator (also simply referred to as "actuator") BR is connected to the wheel cylinder CW through a brake pipe HK. The actuator BR includes a master cylinder CM and a fluid pressure unit HU. For example, the fluid pressure unit HU is configured to include a plurality of electromagnetic valves, a fluid pump, an electric motor, and the like.

At the time the braking control including the oscillation suppression control (damping control) is not executed, the brake fluid pressure Pw corresponding to the operation of the brake operation member BP by the driver is supplied to the wheel cylinder CW of each wheel WH by the actuator BR (particularly, the master cylinder CM). Then, a braking torque corresponding to the operation amount Ba of the brake operation member (brake pedal) BP is applied to each wheel WH. As a result, a braking power F is generated on the wheels WH**.

At the time of execution of braking control such as anti-skid control, traction control, vehicle stabilization control (including oscillation suppression control), and the like, the brake fluid pressure Pw is controlled for every wheel cylinder CW independent from the operation of the brake operation member BP by the actuator BR (particularly, the fluid pressure unit HU). That is, the braking power F of each wheel WH is adjusted independently.

The vehicle includes the actuator BR and the electronic control unit ECU (microcomputer) that is electrically connected to the various sensors (YR etc.) described above. The electronic control unit (also referred to as "controller") ECU is configured by a plurality of independent controller ECUs (ECB, ECP, etc.) connected by a communication bus BS. Each controller (ECB etc.) in the controller ECU executes a dedicated control program. The signals (sensor values) of various sensors and signals (internal calculated values) calculated in each controller are shared through the communication bus BS.

For example, the braking controller ECB is a controller for the actuator BR. A braking operation amount Ba, a steering angle Sa, a wheel speed Vw, a yaw rate Yr, a longitudinal acceleration Gx, a lateral acceleration Gy, and a brake fluid pressure Pw are input to the braking controller ECB. The controller ECB instructs the fluid pressure unit HU to issue a drive signal Hu to execute the braking control described above based on a programmed control algorithm. The electric motor and the electromagnetic valve in the fluid pressure unit HU are driven by the drive signal Hu, and the braking control is realized.

The drive controller ECP is a controller for the power source PR. A throttle opening Th, a fuel injection amount Fi, a driving rotation number Ne of the power source, and a gear position Gr are input to the drive controller ECP. An instruction signal from the braking controller ECB is input to the drive controller ECP through the communication bus BS. In the drive controller ECP, the output of the power source PR is reduced at the time of execution of the traction control and the vehicle stabilization control based on the instruction signal.

<Calculation Process of Oscillation Suppression Control>

Figure 2:
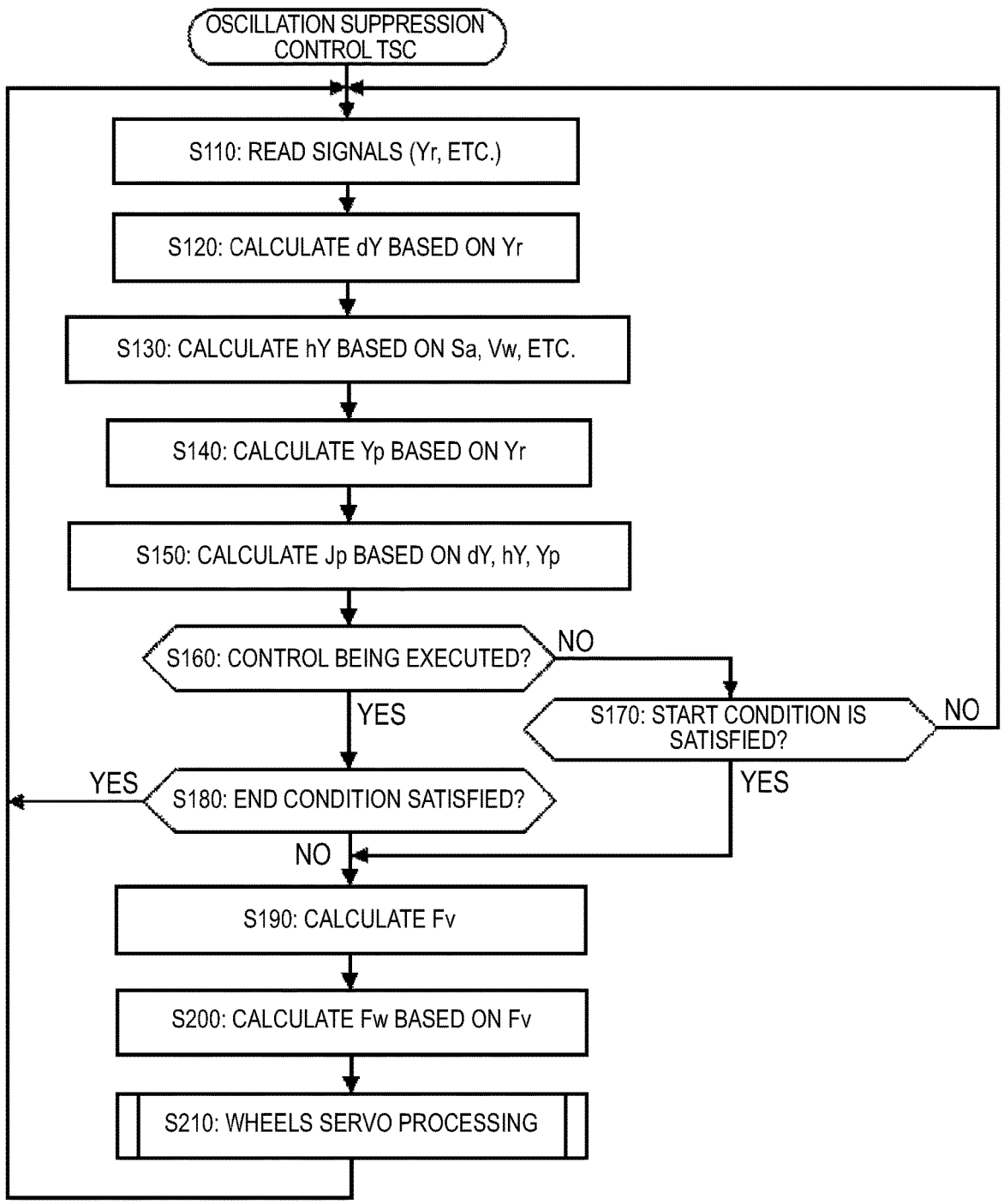
FIG. 2 is a control flow diagram for explaining an outline of a calculation process in a controller ECU.

With reference to the control flow diagram of FIG. 2, the calculation process of the oscillation suppression control (damping control) will be described. "Oscillation suppression control" is for suppressing (damping) the periodic oscillation (sway behavior) of the tractor vehicle originating in the trailer TR, and is also referred to as "damping control" or "trailer sway control". The process of the oscillation suppression control is programmed in the electronic control unit ECU (e.g., braking controller ECB).

In step S110, signals (Sa, Vw, Yr, Gy, etc.) from the steering angle sensor SA, the wheel speed sensor VW, the yaw rate sensor YR, the lateral acceleration sensor GY, and the like are read.

In step S120, yaw angular acceleration dY is calculated based on actual yaw rate Yr. Specifically, the actual yaw rate Yr is time-differentiated to calculate the yaw angular acceleration dY. The yaw angular acceleration dY is a change amount of the actual yaw rate Yr per unit time.

In step S130, a yaw rate deviation hY is calculated based on the steering angle Sa, the wheel speed Vw, and the yaw rate Yr. First, in step S130, the traveling speed (body speed) Vx of the vehicle is calculated based on the wheel speed Vw of each wheel WH detected by the wheel speed sensor VW. For example, at the time of braking (when the brake operation member BP is operated), the body speed Vx is calculated based on the fastest of the four wheel speeds Vw. At the time of non-braking (when the brake operation member BP is not operated), the body speed Vx is calculated based on the slowest of the four wheel speeds Vw.

Then, the standard yaw rate Yt is calculated based on the steering angle Sa and the body speed Vx. The standard yaw rate Yt is a state quantity representing a reference state in which the wheel WH grips the traveling road surface and excessive understeer or oversteer behavior does not occur in the vehicle. Based on the standard yaw rate Yt and the actual yaw rate Yr, the standard yaw rate Yt (standard value) is subtracted from the actual yaw rate Yr (detected value), and a yaw rate deviation hY (=Yr−Yt) is calculated.

In step S140, a yaw rate peak value Yp is calculated based on the actual yaw rate Yr (detected value). The local minimum value Yc and the local maximum value Yo of the yaw rate Yr are determined based on the time-series change of the yaw rate Yr. The absolute values of the local minimum value Yc and the local maximum value Yo are set as the yaw rate peak values Yp.

In step S150, a yaw indicator Jp is calculated based on at least one of the yaw angular acceleration dY, the yaw rate deviation hY, and the yaw rate peak value Yp. The yaw indicator Jp is a state quantity representing the magnitude (degree) of the periodic yaw motion (i.e., oscillation and sway behavior) of the vehicle, and is also referred to as "oscillation indicator Jp". For example, the peak value of the yaw angular acceleration dY (yaw angular acceleration peak value) dYp is adopted as the yaw indicator Jp. That is, the yaw angular acceleration dY is stored in time series (for each calculation period), and the peak value of the stored yaw angular acceleration dY (the absolute value of the local maximum value Do and the local minimum value Dc in one period) is determined as the yaw angular acceleration peak value dYp.

Furthermore, the peak value of the yaw rate deviation hY (yaw rate deviation peak value) hYp may be determined as the yaw indicator (oscillation indicator) Jp. Similarly to the yaw angular acceleration peak value dYp, the yaw rate deviation hY is stored for each calculation period, and the absolute values of the local maximum value Ho and the local minimum value Hc in one period are determined as the yaw rate deviation peak value hYp.

Furthermore, the yaw rate peak value Yp (the absolute value of the extreme values Yc and Yo) calculated in step S140 can be determined as it is as the yaw indicator (oscillation indicator) Jp. In this case, in the oscillating yaw rate (oscillation) Yr, the yaw indicator Jp is updated for every period of the yaw rate Yr. The yaw indicator Jp may be calculated by combining two or more of the yaw angular acceleration peak value dYp, the yaw rate deviation peak value hYp, and the yaw rate peak value Yp.

In step S160, "whether or not the oscillation suppression control is being executed" is determined. When the oscillation suppression control is being executed, affirmative determination is made in step S160, and the process proceeds to step S180. On the other hand, when the oscillation suppression control is not executed, step negative determination is made in S160, and the process proceeds to step S170.

In step S170, "whether or not the start condition of the oscillation suppression control is satisfied" is determined based on the yaw rate peak value Yp. When affirmative determination is made in step S170, the process proceeds to step S190, and oscillation suppression control is started. On the other hand, when negative determination is made in step S170, the process returns to step S110.

In step S180, "whether or not the end condition of the oscillation suppression control is satisfied" is determined based on the yaw rate peak value Yp. When negative determination is made in step S180, the process proceeds to step S190, and the oscillation suppression control is continued. On the other hand, when affirmative determination is made in step S180, the oscillation suppression control is ended, and the process returns to step S110. Details of the start and end determinations of the oscillation suppression control in step S170 and step S180 will be described later.

In steps S190, S200, and S210, the oscillation suppression control is executed. In step S190, a total braking power Fv is calculated based on the body speed Vx, the braking operation amount Ba, and the yaw indicator Jp. The total braking power Fv is a target value of the braking power F applied to the entire vehicle. In step S200, a target value Fw of the braking power of each wheel WH is calculated based on the total braking power Fv and the yaw indicator Jp. Then, in step S210, the braking torque applied to each wheel WH is servo-controlled based on the wheels braking power Fw** (target value). Detailed processing from step S190 to step S210 will be described later.

<Calculation of Yaw Rate Peak Value Yp and Determination of Start and End of Control>

Figure 3:
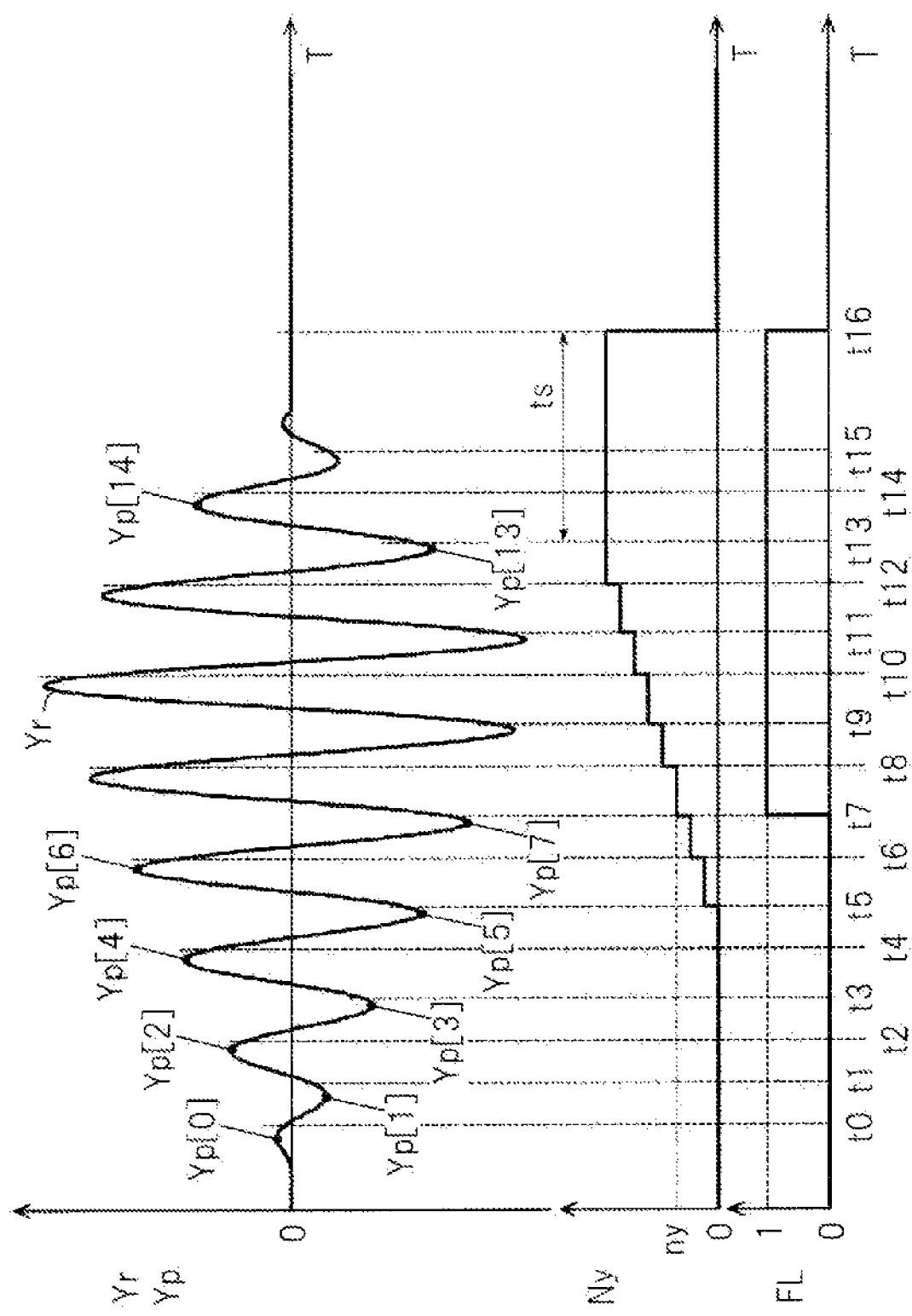
FIG. 3 is a time-series diagram for explaining calculation of a peak value $Yp$ and start and end of a control.

The calculation of the yaw rate peak value Yp and the start and end determination of the control will be described with reference to the time series diagram of FIG. 3.

The local maximum value Yo and the local minimum value Yc of the actual yaw rate Yr are calculated based on the time-series data of the yaw rate Yr after the filtering process. Here, the yaw rate peak value Yp in which the local maximum value Yo and the local minimum value Yc are referred to as a "peak value Yp" is determined based on a comparison between the previous calculated value Yr (n−1) and the current calculated value Yr (n) in the yaw rate Yr.

When the yaw rate Yr is increasing, the yaw rate Yr(n−1) is stored as the local maximum value Yo at the time point (calculation period) at which "Yr (n)>Yr (n−1)" is switched to "Yr (n)<Yr (n−1)". Here, "n" represents a calculation period. Similarly to when the yaw rate Yr is increasing, when the yaw rate Yr is decreasing, the yaw rate Yr(n−1) is stored as the local minimum value Yc at the time point (calculation period) "Yr (n)<Yr (n−1)" is switched to "Yr (n)>Yr (n−1)". Then, the amplitude Ay of the oscillation is calculated based on the yaw rate peak value Yp (i.e., the extreme values Yo, Yc). Specifically, a deviation (absolute value) Ay between the local maximum value Yo and the local minimum value Yc is calculated.

The start of execution of the oscillation suppression control is determined based on the yaw rate amplitude Ay, the threshold amplitude ax, and the threshold number of times nx. When the yaw rate amplitude Ay is greater than or equal to the threshold amplitude ax (Ay≥ax), "1 (time)" is added to the number of oscillations Ny. However, when the amplitude Ay is less than the threshold amplitude ax (Ay<ax), "1" is not added to the number of oscillations Ny, and the number of oscillations is left as it is. That is, the number of times (the number of oscillations) Ny in which the condition "Ay≥ax" is satisfied is calculated. At the time point when the number of oscillations Ny reaches the threshold number of times nx (calculation period), the start of the oscillation suppression control is determined. Here, the threshold amplitude ax is a threshold value for determining the amplitude of the oscillation, and is a preset constant. Furthermore, the threshold number of times nx is a threshold value for determining the number of appearances Ny of the oscillation, and is a preset constant. The influence of noise or the like can be avoided by setting the threshold number of times nx.

The end of the oscillation suppression control is determined based on the number of oscillations Ny. Specifically, the oscillation suppression control is ended at the time point (calculation period) when the time during which the state where the number of oscillations Ny is not increased is continued (the time during which the condition of "Ay<ax" continues to be satisfied) becomes longer than or equal to a predetermined time ts. Furthermore, the oscillation suppression control may be ended when the body speed Vx becomes less than the predetermined speed vs. Here, the predetermined time ts and the predetermined speed vs are threshold values (predetermined values) for end determination set in advance.

For example, a description will be given assuming that the threshold number of times nx is set to "3". The oscillation of the tractor vehicle starts, and the peak value (local maximum value, local minimum value) Yp of the yaw rate Yr is calculated. At time t0 after the local maximum value Yo [0] of the yaw rate Yr actually occurs, the local maximum value Yo [0] is determined and stored. Thereafter, at time t1 after the local minimum value Yc [1] of the yaw rate Yr actually occurs, the local minimum value Yc [1] is calculated. At time t1, the amplitude Ay [1] is calculated as the absolute value of "Yc [1]−Yo [0]". At time t1, the amplitude Ay [1] is less than the threshold amplitude ax, and hence the number of oscillations Ny remains "0". The process is sequentially continued.

At time t5, the local minimum value Yc [5] in the current calculation period is compared with the stored local maximum value Yo [4], and the amplitude Ay [5] (=Ay [5]-Ay [4]) Is calculated. At time t5, the amplitude Ay [5] is greater than or equal to the threshold amplitude ax, and hence the number of oscillations Ny is increased by "1" from "0". However, since the number of oscillations Ny is less than the threshold number of times nx (=3), the oscillation suppression control is not started.

At time t6, the amplitude Ay [6] (=Ay [6]-Ay [5]) is calculated and "Ay [6]≥ax" is satisfied, so the number of oscillations Ny is increased to "2". Furthermore, at time t7, the amplitude Ay [7] (=Ay [7]-Ay [6]) is calculated and "Ay [7]≥ax" is satisfied, so the number of oscillations Ny is increased to "3". At time t7, the number of oscillations Ny reaches the threshold number of times nx, so the execution of the oscillation suppression control is started. At this time, the control flag FL representing the execution state of the oscillation suppression control is changed from "0 (non-execution)" to "1 (executing)".

At time t8, the amplitude Ay [8] is calculated and "Ay [8]≥ax" is satisfied, so the number of oscillations Ny is increased to "4" while the oscillation suppression control is being executed. When the number of oscillations Ny is sequentially increased, the execution of the oscillation suppression control is continued, and the control flag FL is maintained at "1 (execution)".

When the body speed Vx is reduced by executing the oscillation suppression control, and the oscillation (sway behavior) of the tractor vehicle converges, the amplitude Ay of the yaw rate Yr becomes smaller. For example, at time t13, the amplitude Ay [13] is calculated but "Ay [13]<ax", and thus the number of oscillations Ny is not increased. Then, at time t16 at which such a state is continued for a predetermined time ts, the oscillation suppression control is ended, and the control flag FL is switched from "1" to "0". If the condition of "Vx<vs" is satisfied before time t16, the execution of the oscillation suppression control may be ended at that time.

As soon as "Ay≥ax" is satisfied, the oscillation suppression control is not started, and the start of the oscillation suppression control is determined based on the number of times Ny that "Ay≥ax" is satisfied. Thus, the influence of noise can be compensated, and reliable execution of the oscillation suppression control can be achieved.

In the above description, the process of starting and ending the oscillation suppression control based on the actual peak value Yp of the yaw rate Yr (the absolute value of the local maximum value Yo and the local minimum value Yc) has been described. As another processing example, a value "Gy/Vx" obtained by dividing the actual lateral acceleration Gy by the body speed Vx may be adopted instead of the actual yaw rate Yr. Here, the state quantity "Gy/Vx" is a physical quantity of the same dimension as the yaw rate Yr, and is therefore called "calculated yaw rate Ye". Similarly to the above, the local maximum value Eo of the calculated yaw rate Ye and the local minimum value Ec of the calculated yaw rate Ye are calculated based on the time-series data of the calculated yaw rate Ye after the filtering process. Then, the deviation between the local maximum value Eo and the local minimum value Ec is calculated as the amplitude Ae of the calculated yaw rate Ye, and is compared with the threshold amplitude ax. When the amplitude Ae (absolute value) is greater than or equal to the threshold amplitude ax (Ae≥ax), the number of oscillations Ny is increased by "1 (times)". When the number of oscillations Ny becomes greater than or equal to the threshold number of times nx (when "Ny=nx" is satisfied), the oscillation suppression control is started.

The steering angle Sa can be referred to for integrating the number of oscillations Ny. Specifically, as the condition for increasing the number of oscillations Ny, "the direction of the steering angle Sa and the direction of the actual yaw rate Yr (or the calculated yaw rate Ye, that is, the actual lateral acceleration Gy) do not match" can be added. In other words, even if the condition of "Ay≥ax (or "Ae≥ax") is satisfied, the number of oscillations Ny is not increased if the steering angle Sa and the actual yaw rate Yr (or the calculated yaw rate Ye) are in the same direction. The oscillation caused by the steering angle Sa can be distinguished according to the condition. The "direction" is a direction in which the vehicle turns (rightward or leftward), and is represented by a sign of a state quantity (Sa, Yr, Gy, etc.).

In order to reduce the influence of the steering angle Sa, a yaw rate deviation hY may be used instead of the actual yaw rate Yr and the calculated yaw rate Ye. The standard yaw rate Yt is calculated based on the steering angle Sa and the body speed Vx. The difference between the actual yaw rate Yr and the standard yaw rate Yt is determined as the yaw rate deviation hY (i.e., "hY=Yr−Yt"). Similarly to the above, the local maximum value Ho and the local minimum value Hc are calculated based on the time-series data of the yaw rate deviation hY. In the yaw rate deviation hY, the difference between the local maximum value Ho and the local minimum value Hc is calculated as the amplitude Ah, and is compared with the threshold amplitude ax. When the amplitude Ah (absolute value) is greater than or equal to the threshold amplitude ax (Ah≥ax), the number of oscillations Ny is increased by "1", and when the number of oscillations Ny becomes greater than or equal to the threshold number of times nx (when "Ny=nx" is satisfied), the oscillation suppression control can be started.

The start and/or end of the oscillation suppression control can be determined based on time-series data of a plurality of state quantities (Yr etc.). Therefore, the start and end of the oscillation suppression control can be determined based on at least one of the actual yaw rate (detected yaw rate) Yr, the calculated yaw rate Ye (=Gy/Vx), and the yaw rate deviation hY (=Yr-Yt). That is, at least one of the three amplitudes Ay, Ae, and Ah is calculated and compared with the threshold amplitude ax to calculate the number of oscillations Ny. Then, the number of oscillations Ny is compared with the threshold number of times nx, and the start of the oscillation suppression control is determined. Furthermore, when either one of "the time during which the number of oscillations Ny is not increased is longer than or equal to the predetermined time ts" and "the body speed Vx is less than the predetermined speed vs" is satisfied, the oscillation suppression control is ended.

<Calculation Process of Wheels Braking Power Control>

Figure 4:
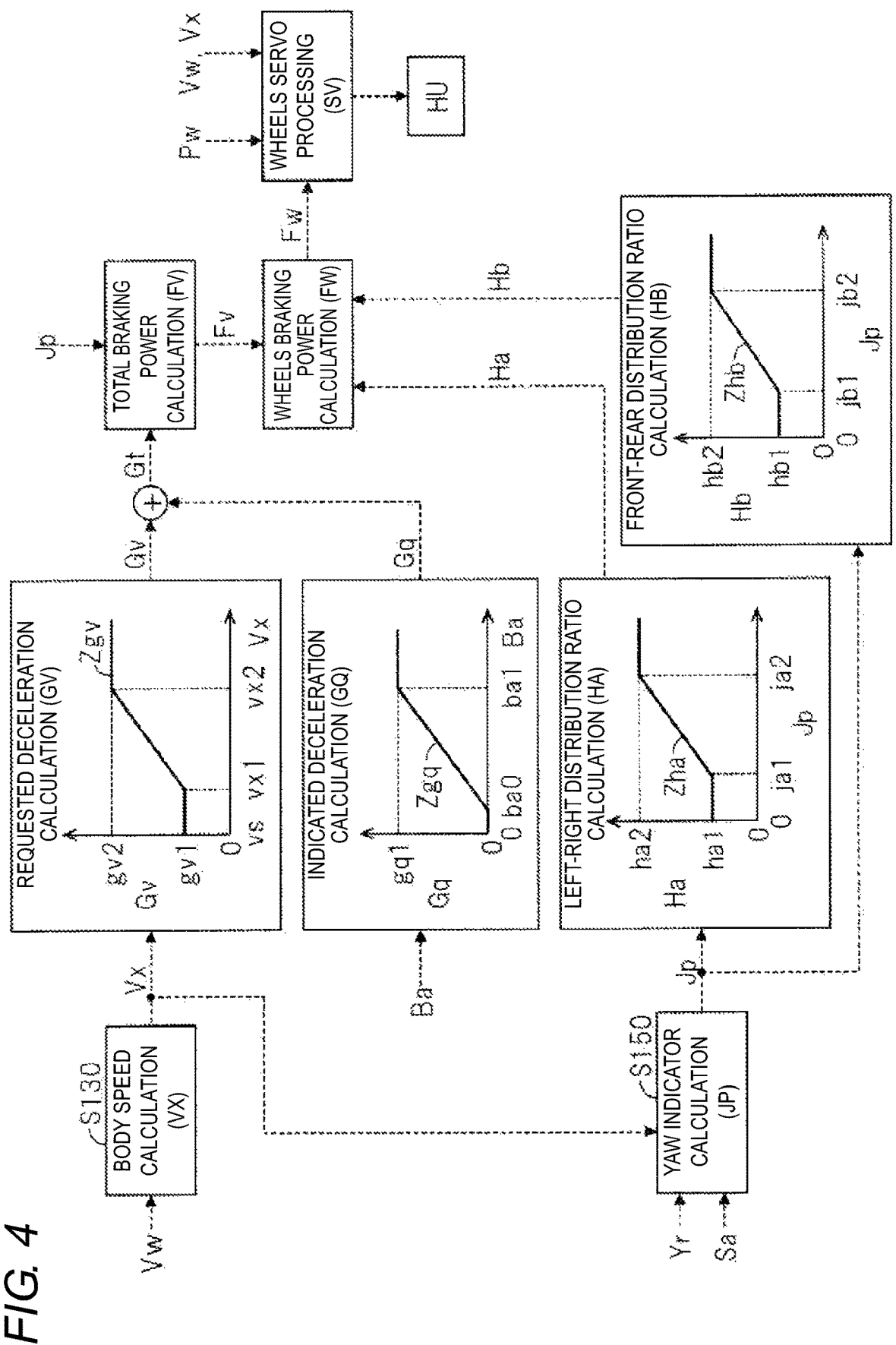
FIG. 4 is a functional block diagram for explaining a calculation process of wheels braking power control $Fw$.

With reference to the functional block diagram of FIG. 4, the process of the braking power control at each wheel WH** in steps S190 to S210 will be described.

As described above, component members, calculation processes, signals, characteristics, and values denoted by the same symbols are of the same function. Furthermore, the subscript "" added to the end of various symbols indicates which of the four wheels on the front, rear, left and right of the tractor VH or the two wheels on the left and right of the trailer TR it relates to. Specifically, in the tractor VH, each subscript corresponds to [fl] for the left front wheel, [fr] for the right front wheel, [rl] for the left rear wheel, and [rr] for the right rear wheel. In the trailer TR, "tl" corresponds to the left wheel, and "tr" corresponds to the right wheel. In addition, the subscript [] may be omitted. Furthermore, "f*" represents the left and right front wheels of the tractor VH, "r*" represents the left and right rear wheels of the tractor VH, and "t*" represents the left and right wheels of the trailer TR.

In the body speed calculation block VX included in step S130, the body speed Vx is calculated based on the wheel speed Vw detected by the wheel speed sensor VW of each wheel WH. For example, at the time of non-braking (include time of acceleration) of the vehicle, the body speed Vx is determined based on the slowest wheel speed among the wheel speeds Vw. At the time of braking of the vehicle, the body speed Vx is determined based on the fastest wheel speed among the wheel speeds Vw.

In the yaw indicator calculation block JP included in step S150, the yaw indicator Jp is calculated based on the yaw rate Yr and the like. The yaw indicator Jp is an indicator representing the degree (magnitude) of the oscillation (periodic yaw motion). In the yaw indicator calculation block JP, the yaw rate peak value Yp calculated based on the yaw rate Yr is determined as the yaw indicator Jp. Here, the yaw rate peak value Yp is an absolute value of the local maximum value Yo and the local minimum value Yc in one period of the fluctuation of the actual yaw rate Yr. Therefore, a large yaw rate peak value Yp indicates that the degree of oscillation is large.

Instead of the peak value Yp of the actual yaw rate Yr, the peak value Ep (absolute value of the local minimum value Ec and the local maximum value Eo of the value (calculated yaw rate) Ye (=Gy/Vx) obtained by dividing the actual lateral acceleration Gy by the body speed Vx is adopted as the yaw indicator Jp. The calculated yaw rate Ye is based on a state quantity equivalent to the yaw rate Yr.

Instead of the actual yaw rate Yr and/or the calculated yaw rate Ye, the yaw indicator Jp can be calculated based on the yaw rate deviation hY. That is, in the yaw rate deviation hY, the absolute value hYp of the local maximum value Ho and the local minimum value Hc is determined as the yaw indicator Jp. In the calculation of the yaw indicator Jp, the influence of the steering angle Sa can be suppressed by using the yaw rate deviation hY.

The peak value of the yaw angular acceleration dY (the yaw angular acceleration peak value) dYp can be adopted as the yaw indicator Jp. That is, in the fluctuation of the yaw angular acceleration dY (the differential value of the yaw rate Yr), the absolute value (yaw angular acceleration peak value) dYp of the local maximum value Do and the local minimum value Dc can be determined as the yaw indicator Jp.

In the above, the peak values Yp, Ep, hYp, and dYp in various state quantities have been determined as the yaw indicator Jp. Instead, the maximum values Ym, Em, hYm, and dYm of the actual yaw rate Yr, the calculated yaw rate Ye, the yaw rate deviation hY, and the yaw angular acceleration dY may be adopted as the yaw indicator Jp. The peak values Yp, Ep, hYp, and dYp are the peak values in each period of the oscillation, but the maximum values Ym, Em, hYm, and dYm are the largest of the peak values Yp, Ep, hYp, and dYp. Therefore, the maximum values Ym, Em, hYm, and dYm are determined based on the peak values Yp, Ep, hYp, and dYp. However, the peak values Yp, Ep, hYp, and dYp represent the degree of oscillation in each period in the oscillation that changes every moment. Thus, the peak values Yp, Ep, hYp, and dYp are suitably adopted as the state quantity (yaw indicator) Jp representing the periodic yaw motion of the tractor vehicle.

The wheels braking power control in steps S190 to S210 includes an indicated deceleration calculation block GQ, a requested deceleration calculation block GV, a total braking power calculation block FV, a left-right distribution ratio calculation block HA, a front-rear distribution ratio calculation block HB, a wheels braking power calculation block FW, and a wheels servo processing block SV.

In the indicated deceleration calculation block GQ, the indicated deceleration Gq is calculated based on the braking operation amount Ba and the calculation map Zgq. The indicated deceleration Gq corresponds to the longitudinal acceleration of the vehicle corresponding to the driver's braking operation. Specifically, the indicated deceleration Gq is "0" when the braking operation amount Ba is less than the predetermined value ba0 based on the calculation map Zgq. When the braking operation amount Ba is greater than or equal to the value ba0 and less than the value ba1 (predetermined value), the indicated deceleration Gq is calculated to increase as the braking operation amount Ba increases. When the braking operation amount Ba is greater than or equal to the value ba1, the indicated deceleration Gq is calculated to a value gq1 (predetermined value). Here, the predetermined value ba0 is a constant set in advance that corresponds to the play of the brake operation member BP.

In the requested deceleration calculation block GV, the requested deceleration Gv is calculated based on the body speed Vx and the calculation map Zgv. The requested deceleration Gv is a deceleration (target value) of the vehicle generated by the oscillation suppression control, which is necessary to attenuate the periodic oscillation of the tractor vehicle. Specifically, when the body speed Vx is less than the value vs, the requested deceleration Gv is not calculated (or remains "0") based on the calculation map Zgv, and the oscillation suppression control is not executed. However, when the body speed Vx is greater than or equal to the value vs and less than the value vx1, the requested deceleration Gv is calculated to the value gv1. When the body speed Vx is greater than or equal to the value vx1 and less than the value vx2, the requested deceleration Gv is calculated to increase as the body speed Vx increases. When the body speed Vx is greater than or equal to the value vx2, the requested deceleration Gv is calculated to a value gv2. That is, in the requested deceleration calculation block GV, based on the calculation map Zgv, the requested deceleration Gv is calculated to be greater as the body speed Vx becomes greater, and the requested deceleration Gv is calculated to be smaller as the body speed Vx becomes smaller. Here, the value vs, the value vx1, the value vx2, the value gv1, and the value gv2 are predetermined values set in advance for the calculation map Zgv.

The indicated deceleration Gq and the requested deceleration Gv are added to calculate the target deceleration Gt. The target deceleration Gt is a final target value of the vehicle deceleration in consideration of the driver's braking operation. Note that at the time of non-braking when the brake operation member BP is not operated, since "Gq=0", and thus "Gt=Gv" is determined. The target deceleration Gt is input to the total braking power calculation block FV.

In a total braking power calculation block FV (corresponds to step S190), a total braking power Fv (target value) is calculated based on the target deceleration Gt. Specifically, in the total braking power calculation block FV, the total braking power Fv (=Mv·Gt) is determined by multiplying the vehicle mass My by the target deceleration Gt. The total braking power Fv is a target value of the total (sum) of the braking powers acting on the entire vehicle. Here, a predetermined value set in advance may be adopted as the vehicle mass My. Furthermore, when the vehicle (the tractor VH+trailer TR) is traveling straight, the output of the power source PR is estimated based on at least one of the throttle opening Th, the power source rotation number Ne, and the fuel injection amount Fi, and the mass My can be calculated based on the longitudinal acceleration Gx generated at this time (or the calculated deceleration Ge that is a differential value of the body speed Vx).

In the total braking power calculation block FV, the total braking power Fv can be adjusted (corrected) based on the yaw indicator Jp. The yaw indicator Jp is a state quantity representing the degree (magnitude) of oscillation, but is adjusted so that the total braking power Fv (target value) becomes greater as the yaw indicator Jp becomes greater (or adjusted so that the total braking power Fv becomes smaller as the yaw indicator Jp becomes smaller). That is, the correction is performed so that the target total braking power Fv increases in accordance with the increase in the yaw indicator Jp. The total braking power Fv is input to the wheels braking power calculation block FW.

As described above, in the total braking power calculation block FV, the total braking power Fv is determined based on the body speed Vx. The oscillation is more likely to occur as the body speed Vx is greater, and is less likely to occur as the body speed Vx is smaller. Therefore, the total braking power Fv is determined based on the body speed Vx, and is allocated (distributed) to the target braking power Fw of each wheel WH in the wheels braking power calculation block FW to be described later. Thus, there is no excess or deficiency in the braking power acting on the entire vehicle, and a stable oscillation suppression control is achieved.

In addition, in the total braking power calculation block FV, the total braking power Fv (target value) determined based on the body speed Vx is corrected in consideration of the yaw indicator Jp. The yaw indicator Jp is a state quantity representing the degree of oscillation, and the adjustment is performed such that the total braking power Fv becomes greater as the yaw indicator Jp becomes greater. The oscillation thus can be reliably suppressed.

In the left-right distribution ratio calculation block HA the left-right distribution ratio Ha is calculated based on the yaw indicator Jp and the calculation map Zha. The left-right distribution ratio Ha is a distribution ratio between the left and right wheels (that is, between the wheels located outside and inside with respect to the turning direction) for allocating the total braking power Fv for achieving the target deceleration Gt to the braking power of the left and right wheels. Here, the turning outer wheel and the turning inner wheel are identified based on the actual yaw rate Yr (particularly, the sign thereof). Specifically, when the turning direction of the vehicle (particularly, the tractor VH) is the leftward direction (that is, left turning) and the actual yaw rate Yr is a positive sign, the right front wheel WHfr and the right rear wheel WHrr are identified as the turning outer wheels, and the left front wheel WHfl and the left rear wheel WHrl are identified as the turning inner wheels. On the other hand, when the turning direction of the vehicle (tractor VH) is the rightward direction (right turning) and the actual yaw rate Yr is a negative sign, the left front wheel WHfl and the left rear wheel WHrl are identified as the turning outer wheels and the right front wheel WHfr and the right rear wheel WHrr are identified as the turning inner wheels. The left-right distribution ratio Ha is a ratio with respect to the turning outer front and rear wheels. Therefore, the ratio with respect to the turning inner front and rear wheels is "1−Ha".

The left-right distribution ratio (the ratio of the turning outer front and rear wheels) Ha is calculated to a value ha1 (a value greater than "0.5") when the yaw indicator Jp is less than the value ja1, based on the calculation map Zha. When the yaw indicator Jp is greater than or equal to the value ja1 and less than the value ja2, the calculation is performed such that the left-right distribution ratio Ha increases in accordance with increase in the yaw indicator Jp. When the yaw indicator Jp is greater than or equal to the value ja2, the left-right distribution ratio Ha is calculated to the value ha2 (a value less than or equal to "1"). Here, the value ja1, the value ja2, the value ha1, and the value ha2 are predetermined values set in advance for the calculation map Zha. Furthermore, since "ha1>0.5, ha2≤1", the distribution ratio Ha of the turning outer wheel is determined to be greater than "0.5" and less than or equal to "1". For example, in the case of "Ha=0.5", the braking power is generated equally on the left and right wheels, and no yaw moment due to the left-right difference of the braking powers is generated. On the other hand, when "Ha=1", the braking power of the oscillation suppression control is not generated on the wheels on the inside with respect to the turning direction, and the braking power is applied only to the outer wheels.

As described above, in the left-right distribution ratio calculation block HA, the turning outer wheel and the turning inner wheel are identified based on the actual yaw rate Yr, and the braking power of the turning outer wheel is determined to be greater than the braking power of the turning inner wheel. As a result, a yaw moment due to the left-right difference in the braking power is generated, and the oscillation can be effectively suppressed.

Furthermore, a large yaw indicator Jp indicates a state where the oscillation is large and fast (a state where the oscillation is rapidly generating). Therefore, as the yaw indicator Jp becomes greater, the distribution ratio Ha of the turning outer wheel is set to be greater. On the other hand, the distribution ratio of the turning inner wheel is determined by "1−Ha", and is set to be small as the yaw indicator Jp is greater. Thus, as the yaw indicator Jp becomes greater, the yaw moment generated by the left-right difference in the braking power is increased. As a result, the yaw moment against the vehicle oscillation is increased, and the periodic oscillation is effectively canceled out.

In the front-rear distribution ratio calculation block HB, the front-rear distribution ratio Hb is calculated based on the yaw indicator Jp and the calculation map Zhb. The front-rear distribution ratio Hb is a distribution ratio between the front and rear wheels for allocating the total braking power Fv (target value) for achieving the target deceleration Gt to the braking power of the front and rear wheels. Here, the front-rear distribution ratio Hb is a ratio to the left and right front wheels. Therefore, the ratio of the two rear wheels is "1−Hb".

The front-rear distribution ratio (the ratio of the two front wheels) Hb is calculated to a value hb1 (a value greater than or equal to "0") when the yaw indicator Jp is less than the value jb1, based on the calculation map Zhb. When the yaw indicator Jp is greater than or equal to the value jb1 and less than the value jb2, the calculation is performed so that the front-rear distribution ratio Hb increases in accordance with increase in the yaw indicator Jp. When the yaw indicator Jp is greater than or equal to the value jb2, the front-rear distribution ratio Hb is calculated to a value hb2 (a value less than or equal to "1"). Here, the value jb1, the value jb2, the value hb1, and the value hb2 are predetermined values set in advance for the calculation map Zhb. Furthermore, since "hb1≥0, hb2≤1", the front-rear distribution ratio Hb is determined to be greater than or equal to "0" or less than or equal to "1". When "Hb=1", the braking power Fr* is not applied to the rear wheel WHr* and only the braking power Ff* of the front wheel WHf* is increased by the oscillation suppression control. On the other hand, when "Hb=0", the braking power is not applied to the front wheel WHf* and only the braking power of the rear wheel WHr* is increased by the oscillation suppression control.

The front wheel WHf* has a greater braking power generation capacity than the rear wheel WHr*. In addition, increasing the braking power Ff* of the front wheel WHf* is more effective in suppressing the oscillation than increasing the braking power Fr* of the rear wheel WHr*. However, if the front wheel braking power Ff* is excessively increased, instantaneous understeer behavior may occur. This understeer behavior gives the driver an uncomfortable feeling, although for a very short time. Therefore, as the yaw indicator Jp becomes greater, the braking power Ff* (target value) of the front wheel WHf* is set to be greater, and the braking power Fr* (target value) of the rear wheel WHr* is set to be smaller.

As described above, in the front-rear distribution ratio calculation block HB, when the yaw indicator Jp is relatively large, the distribution ratio Hb for the front wheels WHf* is set relatively large, and the oscillation is reliably suppressed by the front wheel braking power Ff*. On the other hand, when the yaw indicator Jp is relatively small, the front wheel distribution ratio Hb is set relatively small, and instantaneous understeer behavior due to an increase in the front wheel braking power Ff* can be suppressed.

In the wheels braking power calculation block FW (corresponds to step S200), the target braking power Fw of each wheel WH is calculated based on the total braking power Fv, the left-right distribution ratio Ha, and the front-rear distribution ratio Hb. Specifically, the total braking power Fv is distributed to the braking power (target value) Fw of each wheel WH based on the left-right distribution ratio Ha and the front-rear distribution ratio Hb. For example, the target braking power Fwfs of the turning outer front wheel is calculated by "Fwfs=Fv·Ha·Hb", the target braking power Fwrs of the turning outer rear wheel is calculated by "Fwrs=Fv·Ha·(1−Hb)", the target braking powers Fwfu of the turning inner front wheels is calculated by "Fwfu=Fv·(1−Ha)·Hb", and the target braking power Fwru of the turning inner rear wheel is calculated by "Fwru=Fv·(1−Ha)·(1−Hb)".

In the wheels servo processing block SV (corresponds to step S210), the braking torque applied to each wheel WH is servo-controlled based on the wheels braking power Fw (target value). Here, the servo control is control for quickly bringing (matching) the actual value to the target value. For example, in the wheels servo processing block SV, a detected value (brake fluid pressure) Pw of the brake fluid pressure sensor PW is adopted as a state variable, and feedback control based on the brake fluid pressure Pw is executed. In this case, the target fluid pressure Pt is converted and calculated based on the wheels braking power Fw**. Then, based on the target fluid pressure Pt and the brake fluid pressure Pw (detected value), the feedback control is executed in the brake actuator BR (particularly, the fluid pressure unit HU), so that the actual brake fluid pressure Pw matches the target fluid pressure Pt.

The brake fluid pressure sensor PW can be omitted. In this case, in the wheels servo processing block SV, the slip servo control is executed with the deceleration slip of the wheel (also simply referred to as "wheel slip") Sw of the wheel as the state variable. The servo control based on the wheel slip Sw is based on the fact that when the deceleration slip Sw of the wheel is not excessively large (i.e., when the wheel slip Sw is within a predetermined range), the wheel slip Sw and the wheel braking power F are in a proportional relationship. For example, a deviation (slip speed) hV between the wheel speed Vw and the body speed Vx are used as the wheel slip (state quantity) Sw. Furthermore, the wheel slip rate obtained by dividing the speed deviation hV by the body speed Vx may be adopted as the wheel slip Sw**.

Specifically, in the wheels servo processing block SV, the wheels target braking power Fw is converted into the target slip St. Furthermore, the actual wheel slip Sw is calculated based on the wheel speed Vwr and the body speed Vw. Then, the feedback control related to the wheel slip is executed in the brake actuator BR (particularly, the fluid pressure unit HU) so that the actual wheel deceleration slip Sw approaches and matches the target slip St.

<Operation/Effect>

Hereinafter, the operation and effect of one embodiment of the operation control device CS according to the present invention will be described.

The operation control device CS is mounted on a tractor vehicle including a tractor VH and a trailer TR towed by the tractor VH. The operation control device CS includes a yaw rate sensor YR that detects the actual yaw rate Yr of the tractor VH, and a controller ECU that executes a damping control (oscillation suppression control) for increasing the braking power F of each wheel WH and damping the periodic yaw motion (oscillation) of the tractor vehicle originating in the trailer TR based on the actual yaw rate Yr. The controller ECU calculates a yaw indicator (oscillation indicator) Jp indicating the degree of yaw motion (i.e., oscillation) based on the actual yaw rate Yr. The braking power Ff* of the front wheel WHf* is set greater as the yaw indicator Jp becomes greater. Furthermore, the braking power Fr* of the rear wheel WHr* is set smaller as the yaw indicator Jp becomes greater.

In the oscillation suppression, increasing the front wheel braking power Ff* is more effective than increasing the rear wheel braking power Fr*. However, an excessive increase in the front wheel braking power Ff* may cause a transient understeer behavior, which the driver may feel uncomfortable. Therefore, the distribution Hb of the braking power of the front and rear wheels is adjusted based on the yaw indicator Jp. As a result, when the yaw indicator Jp is large, the oscillation is reliably suppressed. When the yaw indicator Jp is small, the understeer behavior described above can be effectively suppressed.

As the yaw indicator Jp, at least one of "peak value Yp of the actual yaw rate Yr (absolute value of the extreme values Yo and Yc)", "peak value Ep of the calculated yaw rate Ye (absolute value of the extreme values Eo and Ec)", "peak value dYp of the yaw angular acceleration dY (absolute value of the extreme values Do and Dc)" and "peak value hYp of the yaw rate deviation hY (=Yr−Yt) (absolute value of the extreme values Ho and Hc) is adopted. Here, each of the peak values Yp, Ep, hYp, and dYp is determined based on the local maximum value and the local minimum value in one period of the periodic oscillation in each of the state quantities Yr, Ye, hY, and dY.

Furthermore, as the yaw indicator Jp, the maximum values Ym, Em, hYm, and dYm of the various state quantities Yr, Ye, hY, and dY may be adopted instead of the peak values Yp, Ep, hYp, and dYp. Each of the maximum values Ym, Em, hYm, and dYm is a maximum value in a plurality of periods from the start to the end of the oscillation. Therefore, the maximum values Ym, Em, hYm, and dYm are determined based on the peak values Yp, Ep, hYp, and dYp. However, the peak values Yp, Ep, hYp, and dYp represent the degree of oscillation for each period in the oscillation that changes every moment. For this reason, it is desirable that the peak values Yp, Ep, hYp, and dYp are adopted as the state quantity (yaw indicator) Jp representing the periodic yaw motion of the tractor vehicle.

In the operation control device CS, a sum (total braking power) Fv of the braking powers F acting on the tractor VH is calculated based on the body speed Vx of the tractor VH. The total braking power Fv (target value) is distributed to the braking power Fw of each wheel WH** based on the actual yaw rate Yr. For example, the turning outer wheel and the turning inner wheel are determined in the turning direction of the tractor VH based on the actual yaw rate Yr. The total braking power Fv is distributed to the left and right wheels such that the braking powers Fwfs, Fwrs of the turning outer wheels are greater than the braking powers Fwfu, Fwru of the turning inner wheels.

The oscillation is more likely to occur as the body speed Vx is greater, and is less likely to occur as the body speed Vx is smaller. In the operation control device CS, the total braking power Fv is determined based on the body speed Vx, and is distributed to the target value Fw** of the wheels braking power based on the actual yaw rate Yr. Thus, there is no excess or deficiency in the braking power acting on the entire vehicle, and a stable oscillation suppression control is can be achieved all the time. Furthermore, since the braking powers Fwfs, Fwrs of the turning outer wheels are made greater than the braking powers Fwfu, Fwru of the turning inner wheels, a yaw moment for canceling the oscillation can be effectively formed.

In addition, in the operation control device CS, the total braking power Fv (target value) is corrected to become greater as the yaw indicator Jp becomes greater based on the yaw indicator Jp. That is, in determining the total braking power Fv, the yaw indicator Jp is taken into consideration. As described above, the yaw indicator Jp is an indicator representing the magnitude of the oscillation, where the total braking power Fv is adjusted to increase so that a greater vehicle deceleration is obtained as the degree of the oscillation becomes greater. The oscillation thus can be reliably suppressed.

Other Embodiments

Other embodiments will be described below. Other embodiments also have the same effects as above.

In the embodiment described above, the configuration of the disk type braking device (disk brake) has been illustrated. In this case, the friction member MS is a brake pad and the rotating member KT is a brake disk. Instead of the disk type braking device, a drum type braking device (drum brake) can be adopted. In the case of a drum brake, a brake drum is adopted instead of the caliper CP. Furthermore, the friction member MS is a brake shoe and the rotating member KT is a brake drum.

In the embodiment described above, a fluid pressure type using the brake fluid has been exemplified as a device for applying the braking torque to the wheel WH. Instead, an electrical type driven by an electric motor may be adopted. In the electrical device, the rotational power of the electric motor is converted into a linear power, whereby the friction member MS is pressed against the rotating member KT. Therefore, the braking torque is directly generated by the electric motor without depending on the pressure of the brake fluid. Furthermore, a composite type configuration in which a fluid pressure type using a brake fluid is adopted for the front wheel, and an electrical type is adopted for the rear wheel can be formed.

In the embodiment described above, the trailer TR with two wheels WHt* has been exemplified. The trailer TR may have four wheels or more.

The invention claimed is:

1. An operation control device for a tractor vehicle including a tractor and a trailer towed by the tractor, the operation control device comprising:
 a yaw rate sensor that detects an actual yaw rate of the tractor; and
 a controller that executes a damping control of increasing a braking power of each of wheels of the tractor based on the actual yaw rate, and damping a periodic yaw motion of the tractor vehicle originating in the trailer,
 wherein the controller is configured to:
 calculate a yaw indicator representing a degree of the yaw motion based on the actual yaw rate; and
 set the braking power of front wheels of the wheels to be greater and set the braking power of rear wheels of the wheels to be smaller as the yaw indicator becomes greater.

2. The operation control device for the tractor vehicle according to claim 1, wherein the controller is configured to:
 calculate a peak value of the actual yaw rate; and determine the peak value of the actual yaw rate as the yaw indicator.

3. The operation control device for the tractor vehicle according to claim 1, wherein the controller is configured to:
 calculate a yaw angular acceleration based on the actual yaw rate; and determine the yaw indicator based on a peak value of the yaw angular acceleration.

4. The operation control device for the tractor vehicle according to claim 1, further comprising:
 a steering angle sensor that detects a steering angle of the tractor,
 wherein the controller is configured to:
 calculate a standard yaw rate based on the steering angle, calculate a yaw rate deviation based on the standard yaw rate and the actual yaw rate; and determine the yaw indicator based on a peak value of the yaw rate deviation.

5. An operation control device for a tractor vehicle including a tractor and a trailer towed by the tractor, the operation control device comprising:
 a yaw rate sensor that detects an actual yaw rate of the tractor;
 a wheel speed sensor that detects a speed of each of wheels of the tractor as a wheel speed; and
 a controller that executes a damping control of increasing a braking power of each of the wheels based on the actual yaw rate, and damping a periodic yaw motion of the tractor vehicle originating in the trailer,
 wherein the controller is configured to:
 calculate a body speed of the tractor based on the wheel speed;
 calculate a sum of braking powers acting on the tractor based on the body speed as a total braking power; and
 distribute the total braking power to the braking powers of each of the wheels based on the actual yaw rate.

6. The operation control device for the tractor vehicle according to claim 5, wherein the controller is configured to:
 calculate a yaw indicator representing a degree of the yaw motion based on the actual yaw rate; and correct the total braking power to be greater as the yaw indicator becomes greater.

* * * * *